(12) United States Patent  
Yamanouchi et al.

(10) Patent No.: US 7,707,924 B2
(45) Date of Patent: May 4, 2010

(54) LINEAR ACTUATOR

(75) Inventors: Hiroshi Yamanouchi, Saitama (JP); Katsutoshi Tada, Greensboro, NC (US); Masaru Oono, Hyogo (JP); Tetsuji Sato, Hyogo (JP)

(73) Assignees: Honda Giken Kogyo Kabushiki Kaisha, Tokyo (JP); Sumitomo Precision Products Co., Ltd., Hyogo (JP)

( * ) Notice: Subject to any disclaimer, the term of this patent is extended or adjusted under 35 U.S.C. 154(b) by 0 days.

(21) Appl. No.: 11/062,442

(22) Filed: Feb. 23, 2005

(65) Prior Publication Data
US 2005/0207910 A1  Sep. 22, 2005

(30) Foreign Application Priority Data
Feb. 24, 2004 (JP) .............................. 2004-047145

(51) Int. Cl.
*F15B 15/26* (2006.01)
(52) U.S. Cl. ...................................... 92/21 MR; 92/24
(58) Field of Classification Search .............. 92/21 MR, 92/24
See application file for complete search history.

(56) References Cited

U.S. PATENT DOCUMENTS

| 3,393,883 | A | * | 7/1968 | Smith et al. ............. 244/102 R |
| 3,813,065 | A |   | 5/1974 | Hallesy et al. |
| 4,392,556 | A | * | 7/1983 | Deutsch .................... 92/21 MR |
| 4,568,045 | A | * | 2/1986 | Mayer ..................... 244/102 R |
| 5,097,748 | A |   | 3/1992 | Koch et al. |
| 5,184,465 | A |   | 2/1993 | Howard et al. |
| 6,345,786 | B1 | * | 2/2002 | Sakurai ................... 244/102 R |
| 6,832,540 | B2 | * | 12/2004 | Hart ............................... 92/24 |

FOREIGN PATENT DOCUMENTS

| JP | 33-1927 A | 11/1953 |
| JP | 4-113006 A | 4/1992 |
| JP | 11-59592 A | 3/1999 |
| JP | 2001-311406 A | 11/2001 |

OTHER PUBLICATIONS

Darlington R.F. Dr., "Landing Gear- A Complete Systems Approach", Vertiflite An American Helicopter Society, Apr. 9, 1998, pp. 32-34.

* cited by examiner

*Primary Examiner*—F. Daniel Lopez
(74) *Attorney, Agent, or Firm*—Birch, Stewart, Kolasch & Birch, LLP

(57) ABSTRACT

A groove is provided to the rear of an inner wall of a cylinder. A locking ram capable of freely sliding in a radial direction and a cam rod having a profile changing with a transition from the rear to the front from a small diameter part to a large diameter part that are provided relative to a piston. The inner end of the locking ram makes contact with the profile, and the cam rod is urged to the rear by the spring, so that the cam rod can be pushed to the front by a push rod. The piston can therefore be locked with a simple structure, and it is possible to provide a linear actuator where locking can be released with a straightforward operation even when a pressurized oil source fails.

31 Claims, 5 Drawing Sheets

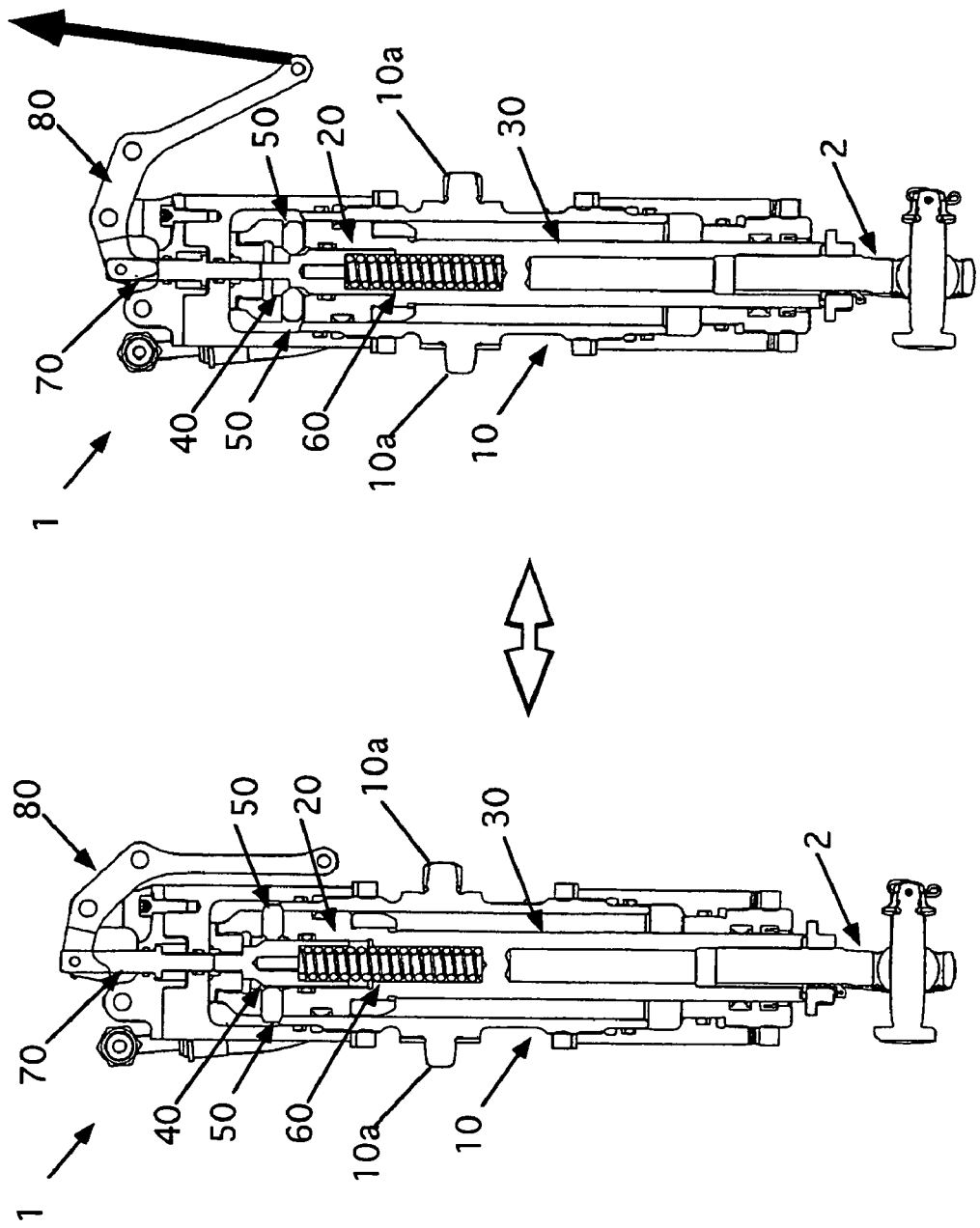

LINEAR ACTUATOR

CROSS-REFERENCE TO RELATED APPLICATIONS

The present application claims priority under 35 USC 119 to Japanese Patent Application No. 2004-047145 filed on Feb. 24, 2004 the entire contents of which are hereby incorporated by reference.

BACKGROUND OF THE INVENTION

1. Field of the Invention

The present invention relates to a linear actuator capable of generating thrust in a direction from front to back. In particular, the present invention relates to a linear actuator including a mechanism for locking the motion of a piston.

2. Background of the Invention

There is a desire to mechanically lock the motion of a piston after an operation as a result of actuation by oil pressure in the event the piston is used as a linear actuator for a translation cylinder etc.

In a typical structure, the piston is mechanically locked at the time when the piston is in a prescribed position of a stroke. When it is desired to release the lock, the lock is released by introducing pressurized oil supplied to the translation cylinder so that the piston is released.

However, with the above structure, it is not possible for the locking to be released in the event that a pressurized oil supply is damaged so that oil pressure cannot be supplied. There has therefore been a demand for a linear actuator for which locking can be reliably released even in the event of the pressurized oil supply becoming damaged.

SUMMARY AND OBJECTS OF THE INVENTION

In order to resolve the aforementioned problems, the present invention sets out to provide a linear actuator of a simple structure that is capable of locking a piston and is capable of releasing the locking with a simple operation in the event that the pressurized oil source becomes damaged.

In the present invention, a linear actuator is capable of generating thrust in a direction back and forth and includes a cylinder having an overall cylindrical space with an inner wall of a prescribed internal diameter D and being provided with a groove having an internal dimension that is larger than the internal diameter D to the rear of the inner wall. A piston is provided for sealing a gap with the inner wall and is supported so as to be capable of freely sliding back and forth. A cam rod constituting an axial body supported at the piston so as to be capable of freely sliding back and forth is provided with a rear end exposed at the rear of the piston. The cam rod has a profile that is changed at one location from a small diameter part of diameter D1 to a large diameter part of a diameter D2 larger than D1 in accordance with a transition from the rear to the front. A locking ram includes a block supported at the piston in a manner freely slidable in a radial direction, with an outer end of the locking ram constituting an end on the outside in a radial direction being capable of being projecting out from or pulled in to a line for a distance of D/2 from the center of the piston so that an inner end of the locking ram constituting an end on the inside in the radial direction is capable of coming into contact with the profile. A spring is built-into the piston for urging the cam rod to the rear. A push rod, constituting an axial body supported in a freely sliding manner in a direction back and forth at the cylinder is provided so that the rear end is exposed at the rear part of the cylinder and the front end is exposed at the rear part of the overall cylindrical space.

While the piston moves to the rear part of the overall cylindrical space, the inner end of the locking ram presses against the large diameter part so that the outer end of the locking ram fits into the groove. In this state, the front end of the push rod is able to press the cam rod.

In the structure of the present invention described above, an overall cylindrical space of the cylinder is provided having an inner wall of a prescribed internal diameter D, and a groove to the rear of the inner wall having an internal dimension larger than the internal diameter D. A piston seals a gap with the inner wall and is supported so as to be capable of freely sliding back and forth. The rear end of the cam rod is exposed at the rear of the piston and is supported at the piston in such a manner so as to be freely slidable in a direction back and forth. The cam rod has a profile changing at one location from a small diameter part of diameter D1 to a large diameter part of a diameter D2 larger than D1 in accordance with a transition from the rear to the front. A locking ram constituting a block supported at the piston in a manner freely slidable in a radial direction is provided. An outer end of the locking ram is capable of projecting Out from or being pulled into a line for a distance of D/2 from the center of the piston, so that an inner end of the locking ram is capable of coming into contact with the profile. A spring built-into the piston urges the cam rod to the rear. A push rod constitutes an axial body supported in a freely sliding manner in a direction back and forth at the cylinder so that the rear end is exposed at the rear part of the cylinder and the front end is exposed at the rear part of the overall cylindrical space. While the piston moves to the rear part of the overall cylindrical space, the inner end of the locking ram presses against the large diameter part so that the outer end of the locking ram fits into the groove. In this state, the front end of the push rod is able to press the cam rod. When the piston then moves to the rear part of the overall cylindrical space so as to be locked, when the rear part of the push rod is then pushed, the push rod moves the cam rod to the front, the inner end of the locking ram collides with the small diameter part, the outer end of the locking ram comes out from the groove so that the piston is able to advance.

In the following, a description is given of several embodiments of a linear actuator of the present invention. The present invention incorporates any of the embodiments disclosed below or two or more combinations thereof.

A linear actuator of an embodiment of the present invention further includes a piston rod constituting a cylindrical member, with one end coupled to the front part of the piston, and the other end passing through so as to seal the front part of the cylinder so as to enable coupling at a rod end. Pressurized oil is selectively provided to a front hydraulic chamber and a rear hydraulic chamber of the overall cylindrical space dividing the piston to the front and rear. The rod end is connected to and is subjected to action urged to the front by a prescribed force.

In the configuration of the above embodiment, a piston rod constituting a cylindrical member has one end coupled to the front part of the piston, with the other end passing through so as to seal the front part of the cylinder so as to enable coupling at a rod end. Pressurized oil is selectively provided to a front hydraulic chamber and a rear hydraulic chamber of the overall cylindrical space dividing the piston to the front and rear. The rod end is connected to and is subjected to an action urged to the front by a prescribed force. The piston rod is therefore capable of moving back and forth, and in the event that the pressurized oil supply fails when the piston moves to the rear so as to become locked, when the rear part of the push rod is pushed, locking of the piston is released, and the piston can be made to advance using a prescribed force.

Further, with the linear actuator of the embodiment of the present invention, the subject of action is a leg support structure for the time of stowing providing support from below when the leg for a flying or floating moving body is stowed.

In the configuration of the above embodiment, the subject of action is a leg support structure for the time of stowing providing support from below when the leg for a flying or floating moving body is stowed. Therefore, even in cases where the oil pressure supply of the moving body fails, when the rear part of the push rod is pressed, locking of the piston is released, the piston and piston rod advance due to the weight of the leg, and supporting of the leg is released.

Further, the linear actuator of the embodiment of the present invention further comprises a release lever constituting a lever capable of pushing the rear end of the push rod to the front, and the release lever is supported in a freely swinging manner at an outer part of the cylinder.

In the configuration of the aforementioned embodiment, the release lever is supported in a freely swinging manner at an outer part of the cylinder. Therefore, when the release lever is made to swing as a result of an external operation, the release lever pushes the rear part of the push rod to the front, and the push rod can make the cam rod move to the front.

Further, the linear actuator of the embodiment of the present invention is such that the cylinder has a swinging support point supporting the linear actuator in a manner capable of swinging at an outer wall.

Moreover, in the configuration of the above embodiment, the cylinder has a swinging support point supporting the linear actuator in a manner capable of swinging at an outer wall. The translation cylinder is therefore capable of swinging centrally about the swinging support point.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4A and FIG. 4B are operation views of a linear actuator of the embodiment of the present invention;

DETAILED DESCRIPTION OF THE PREFERRED EMBODIMENTS

The following is a description with reference to the drawings of an embodiment of the present invention. In each of the drawings, common portions are assigned the same numerals and duplicated description thereof is omitted.

Figure 1:
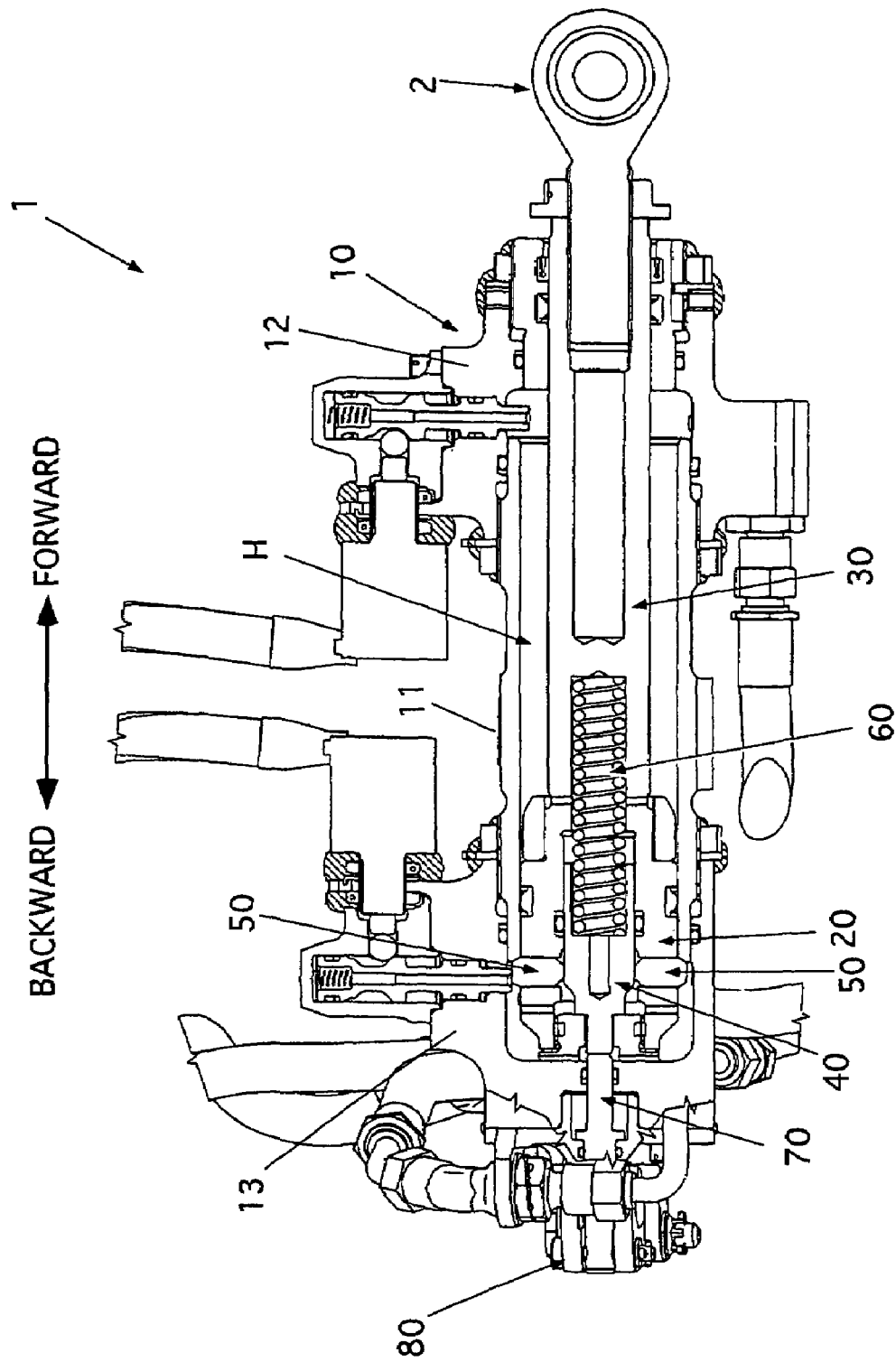
FIG. 1 is a cross-sectional view of a linear actuator of an embodiment of the present invention.
Figure 2:
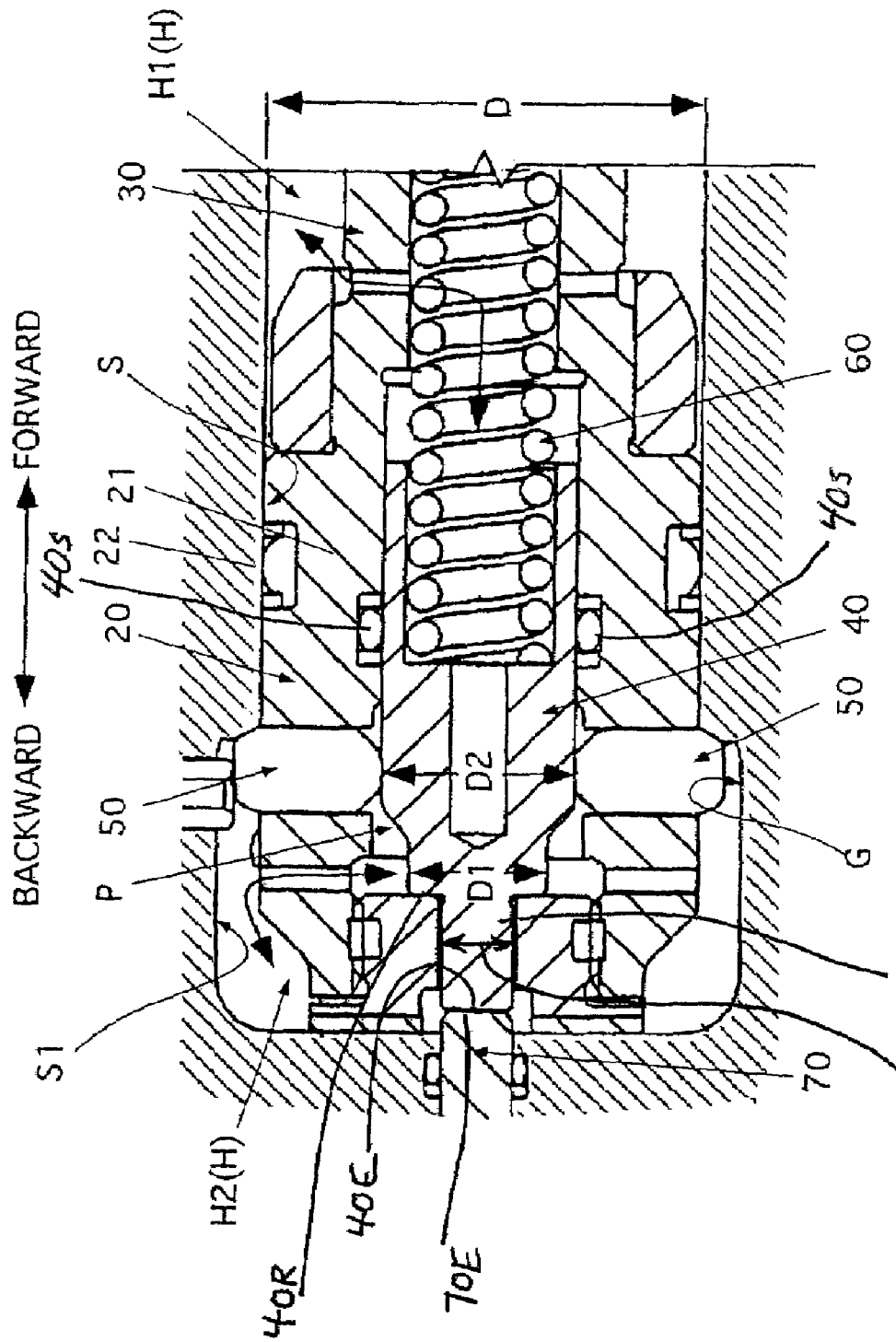
FIG. 2 is a partial cross-sectional view of a linear actuator of an embodiment of the present invention.

As illustrated in FIGS. 1 and 2, a linear actuator 1 is an item of equipment capable of generating thrust in a direction back and forth. The linear actuator 1 includes a cylinder 10, piston 20, piston rod 30, cam rod 40, locking rams 50, spring 60, push-rod 70, and release lever 80.

A hydraulic valve (not shown) supplies pressurized oil to the linear actuator 1.

The cylinder 10 has an overall cylindrical space H and includes a cylinder tube 11, front head cover 12, and rear head cover 13. The overall cylindrical space H has an inner wall S of a prescribed internal diameter D and is provided with a groove G to the rear of the inner wall S and having an internal dimension larger than the internal diameter D.

The cylinder tube 11 is a cylindrical member of internal diameter D. The inner wall S is formed on the inside of the cylinder tube 11. A swinging support point 10a (shown in FIG. 4) that is capable of enabling the translation cylinder to swing is provided on an outer wall of the cylinder tube 11.

The front head cover 12 is a member provided at the front of the cylinder tube 11. The end surface of the front head cover 12 closes the front of the overall cylindrical space H.

FIG. 1 shows the cylinder tube 11 fitting into a hole provided at the front head cover 12.

The rear head cover 13 is a member provided at the rear of the cylinder tube 11. The end surface of the rear head cover 13 closes the rear of the overall cylindrical space H.

FIG. 1 is a view showing a cylinder tube 11 inserted into a hole provided at the rear head cover 13, with an inner wall S1 of the hole for the rear head cover 13 and the end surface of the rear of the cylinder tube 11 combining so as to form a groove G.

The piston 20 is a member supported in a manner so as to be slidable in a direction back and forth while closing a gap at the inner wall S in a fluid-tight manner. The piston 20 includes a piston body 21 and a piston seal 22.

The piston body 21 is a substantially columnar member having an external diameter that is slightly smaller than the internal diameter of the inner wall S. A seal groove is provided in a ring-shape about the outer surface of the piston body 21.

The piston seal 22 is a member for sealing a gap between the inner wall S and the piston body 21 in a fluid-tight manner. The piston seal 22 is housed in the seal groove.

The piston 20 slides at the piston seal 22 and the inner wall S so as to move in a direction back and forth. The piston 20 divides the overall cylindrical space H from the front to rear. The front part of the overall cylindrical space H is referred to as front hydraulic chamber H1 and the rear part of the overall cylindrical space H is referred to as rear hydraulic chamber H2.

The cam rod 40 is an axial body with a rear end exposed at the rear of the piston supported at the piston in such a manner so as to be freely slidable in a direction from front to rear. The axial body has a profile P changing from a small diameter section of diameter D1 to a large diameter section of diameter D2 larger than D1 in accompaniment with a transition from the rear to the front at one location. A cam rod seal 40S is positioned on the cam rod 40 for sealing a gap with the cam rod 40 and an inner wall of the piston 20 in which the cam rod 40 is slidably engaged.

FIG. 2 shows a portion of the cam rod 40 including a projection 40P having a flat end surface 40E and an outer diameter Dp is formed at a rear end of the cam rod 40, a ring portion 40R extending in a radial direction at a front end of the projection 40P, a portion (small diameter part) of diameter D1 extending forwardly from an outer peripheral edge of the ring portion 40R, a portion 40C formed in a conical shape broadening from a diameter D1 to a diameter D2, and a portion (large diameter part) of diameter D2 each of which is formed into a single body. The outer surfaces of the projection 40P, small diameter part, conical part, and large diameter part form a profile P, with D2>D1>Dp.

A side of the front of the cam rod 40 is hollowed out into a columnar shape into which a portion to the rear of the spring 60 described later is inserted.

The locking ram 50 is a block supported at the piston 20 so as to be freely slidable in a radial direction. This block is such that an end (hereafter referred to as the "outer end of the locking ram") on the outer side of the radial direction may project out or be pulled in from a line for a distance D/2 from the center of the piston in such a manner that the end (hereafter referred to as the "inner end of the locking ram") of the inside of the radial direction comes into contact with the profile P.

For example, in the event that the diameter of the outer surface of the piston 20 is substantially the same as D, when the inner end of the locking ram comes into contact with the small diameter part of the profile P, the outer end of the locking ram is withdrawn from the outer surface of the piston 20. Further, when the inner end of the locking ram makes contact with the large diameter part of the profile P, the outer end of the locking ram projects out from the outer surface of the piston 20.

While the piston 20 moves in the rear part of the overall cylindrical space H, the inner end of the locking ram presses against the large diameter part so that the outer end of the locking ram fits into the groove G.

FIG. 2 shows when the piston 20 is positioned to the rear of the overall cylindrical space H, the inner end of the locking ram comes into contact with the large diameter part, and the outer end of the locking ram fits into the groove G.

The spring 60 is a mechanical element built-into the piston urging the cam rod to the rear.

FIG. 1 and FIG. 2 show the coiled spring built-into the piston 20. A front end of the coiled spring 60 comes into contact with a hole formed in the integral piston 20 and piston rod 30. The rear end of the coiled spring 60 comes into contact with a hole formed in the cam rod 40. The spring 60 urges the cam rod 40 to the rear with a force equal to the compression force.

The push-rod 70 is an axial body supported at the cylinder in a freely sliding manner in a direction from front to rear. A rear end of this axial body is exposed at a rear part of the cylinder 10 and a front end is exposed at a rear part of the overall cylindrical space H. While the piston 20 is moving at the rear part of the overall cylindrical space H, in this state, the front end of the push-rod 70 is capable of pushing the cam rod 40.

FIG. 2 shows when the flat front end surface 70E of the front end of the push-rod 70 comes into contact with the flat end surface 40E of projection 40P at the rear end of the cam rod 40. In the state in FIG. 2, when the push-rod 70 moves to the front, the cam rod 40 moves to the front against the urging force of the spring 50. When the cam rod 40 moves to the front within the piston 20, the inner end of the locking ram 50 comes into contact with the small diameter part of the profile P and the outer end of the locking ram 50 is withdrawn from the outer surface of the piston 20. When this state is entered, the fining of the locking ram 50 and the groove G slips out.

The release lever 80 is a lever for advancing the push rod 70 forward due to an operation from outside.

A front end of the release lever 80 is coupled in a freely sliding manner to the rear end of the push rod 70.

The rear end of the release lever 80 is connected to an operation wire. The operation wire can then be pulled by an operator.

A swinging shaft provided at a central part of the release lever 80 is connected in a freely rocking manner to the rear head cover 13.

The distance between the front end and the swinging shaft is shorter than the distance between the rear end and the swinging shaft. As a result of this, the pulling force of the operation wire transfers the pushing force of the release lever as a result of the leverage.

When an operator pulls the operation wire from an operation room, as a result of this leverage, the rear end of the push rod 70 can be pushed to the front. It is therefore possible for an operator to cause the push rod 70 to advance to the front with little force.

The hydraulic valve is hydraulic equipment for selectively supplying compressed oil to the front hydraulic chamber H1 and the rear hydraulic chamber H2 of the overall cylindrical space H. When the hydraulic valve is switched, the front hydraulic chamber H1 and the rear hydraulic chamber H2 communicate with the power line and the tank line of the pressurized oil source.

Next, the operation of a linear actuator of the embodiment of the present invention is described based on the drawings.

FIG. 4A and FIG. 4B are operational views of a linear actuator of the embodiment of the present invention. FIG. 4A shows a situation where the locking ram fits into the groove G. FIG. 4B shows a situation where the release lever is pulled so as to release the fitting of the locking ram and the groove G.

In FIG. 4A and FIG. 4B the front of the linear actuator faces downwards and the rear of the linear actuator faces upwards.

A description is given of an example of the case where the linear actuator is made to operate using pressurized oil.

First, the description commences referring to the process of advancing the piston 20 and the piston rod 30 as shown in FIG. 4B.

Advancing Process

When the hydraulic valve is operated, the rear hydraulic chamber H2 communicates with the power line, and the front hydraulic chamber H1 communicates with the tank line.

Pressurized oil then flows into the rear hydraulic chamber H2. The cam rod 40 then moves to the front against the urging of the spring 60 because the pressurized oil presses the rear end of the cam rod 40. Locations of the profile P making contact with the inner end of the locking ram then move from the large diameter part to the small diameter part and the locking ram 50 moves towards the inside in a radial direction. Fitting of the locking ram 50 and the groove G then slips out.

The pressurized oil then presses the piston 20 to the front. The piston 20 and the piston rod 30 then advance.

Retraction Process

When the hydraulic valve is operated, the front hydraulic chamber H1 communicates with the power line, and the rear hydraulic chamber H2 communicates with the tank line.

The pressurized oil pushes the piston 20 to the rear and the piston 20 and piston rod 30 therefore retract. The pressurized oil therefore presses the front end of the cam rod 40. The conical part of the profile P then presses the inner end of the locking ram to the rear. The locking ram 50 is then subjected to a force to the outside in a radial direction as a result of a wedging effect.

The piston 20 then moves to the rear part of the overall cylindrical space H so that when the outer end of the locking ram reaches a position facing the groove G, the locking ram 50 moves to the outer side in a radial direction, and the outer end of the locking ram fits with the groove G.

In the retraction process, piston 20 and the piston rod 30 then move to the rear so as to reach the state of FIG. 1 and FIG. 4A.

In the Event of Oil Pressure of the Pressurized Oil Supply Dropping"

In the event that the pressurized oil supply is damaged so that the pressure of the pressurized oil drops, the operation wire is pulled manually. When the rear part of the release lever 80 is pulled, the front part of the release lever 80 pushes the rear end of the push-rod 70 to the front.

When the push-rod 70 moves to the front, the cam rod 40 moves to the front against the urging force of the spring 60. When the cam rod 40 moves to the front within the piston 20, the inner end of the locking ram comes into contact with the small diameter part of the profile P and the outer end of the locking ram 50 is withdrawn from the outer surface of the piston 20. When this state is entered, the fitting of the locking ram 50 and the groove G slips out.

It is therefore possible for the piston 20 and the piston rod 30 to advance.

For example, in the event that the piston rod 30 is connected to an item subjected to urging by a prescribed force that is always towards the front, the piston 20 and piston rod 30 advance.

Next, a description is given of an example of utilizing a linear actuator of the embodiment of the present invention. A description is given of an example of utilization by adoption of a linear actuator in a leg structure for a moving body that moves by flying or floating.

Figure 3A:
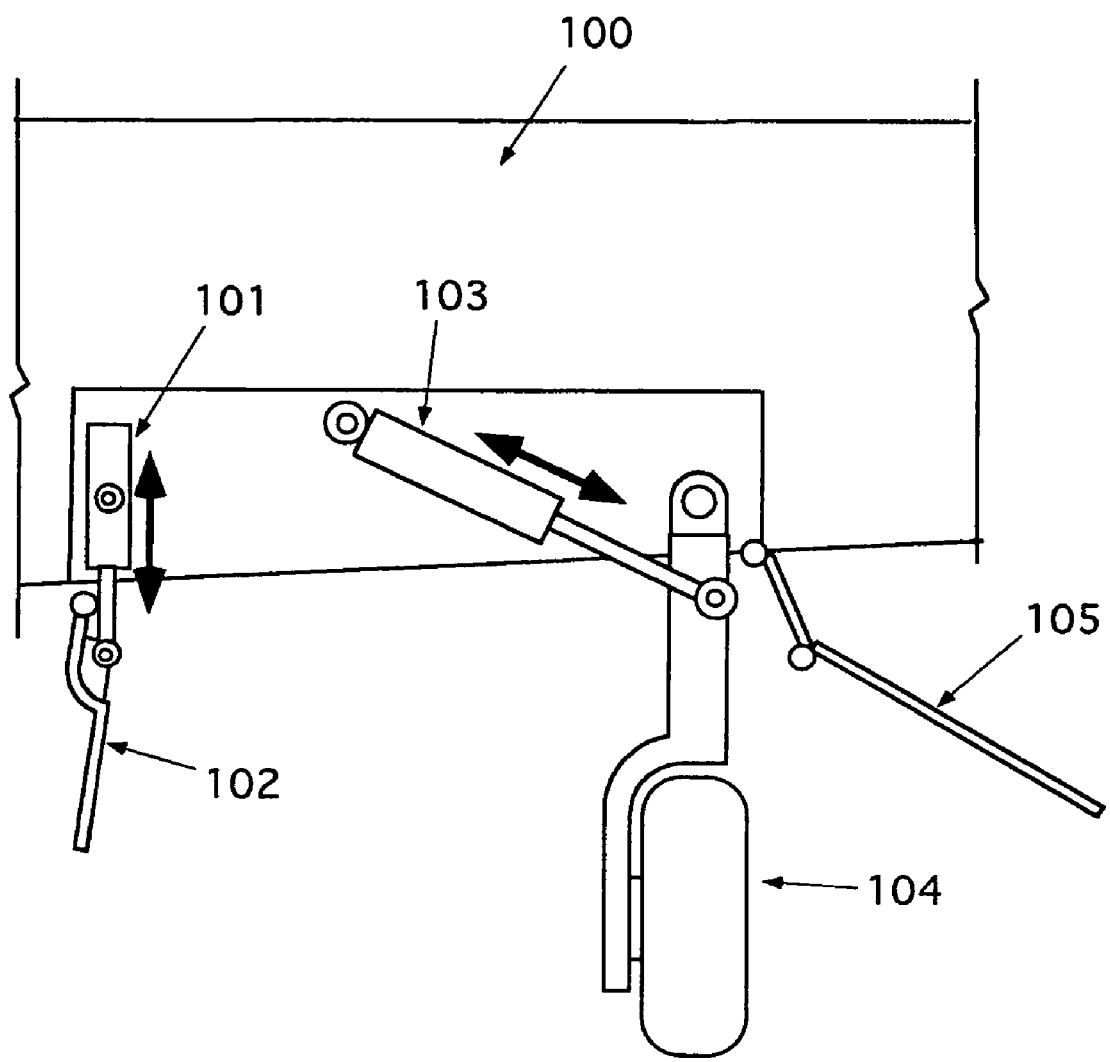
FIG. 3A and FIG. 3B are outline drawings of a leg structure for moving body use in the embodiment of the present invention.
Figure 3B:
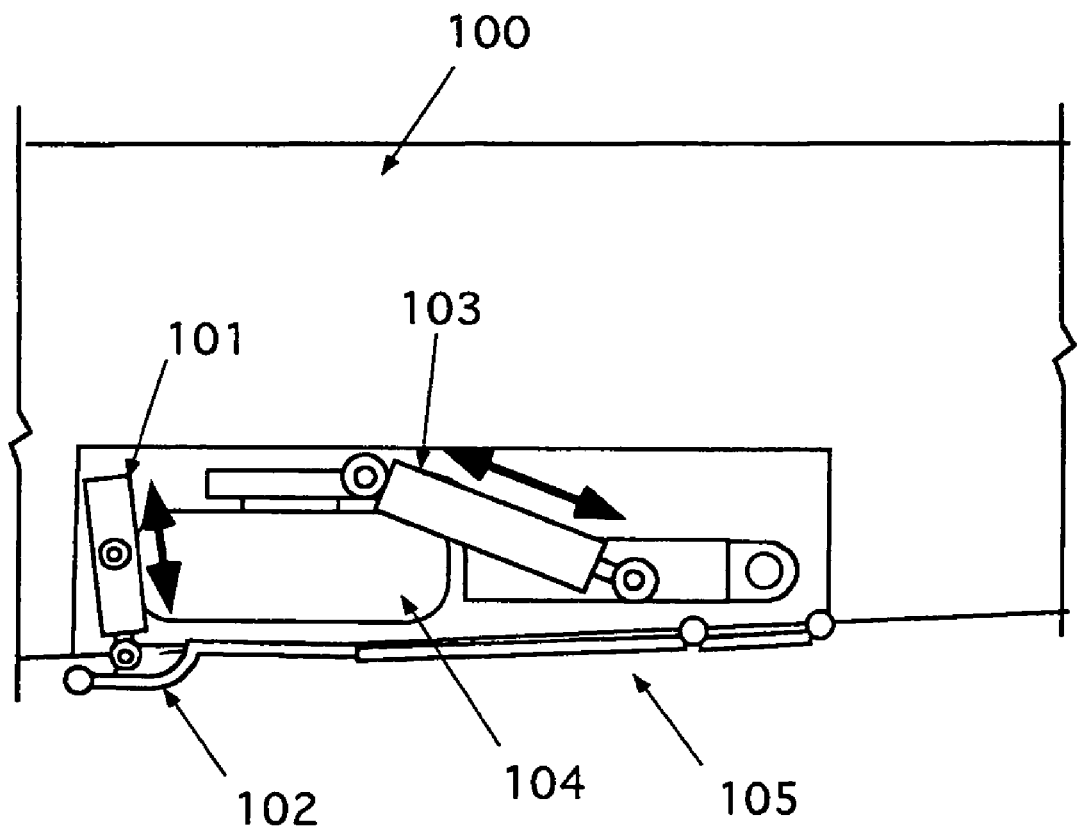

FIG. 3A and FIG. 3B are outline drawings of a leg structure for a moving body by using the embodiment of the present invention.

The posture of the leg structure for the moving body changes between a stowed posture for stowing a wheel in a main structure 100 of the moving body and a landing posture for landing the wheel on a ground surface.

FIG. 3A shows the landing posture.

FIG. 3B shows the stowed posture.

The leg structure for the moving body in use includes an inboard hydraulic cylinder 101 (corresponding to the linear actuator) for inboard door use, an inboard door 102 (corresponding to a leg support structure for the time of storage), a leg supporting hydraulic cylinder 103, a leg 104, and an outboard door 105.

The linear actuator 1 of the embodiment of the present invention is adopted in the inboard hydraulic cylinder 101.

One end of an operation wire (not shown) is connected to a release lever for the inboard hydraulic cylinder 101 for inboard door use and the other end is provided in a flight deck.

The inboard hydraulic cylinder 101 is an actuator for opening and closing an inboard door 102 and is an actuator for supporting the leg 104 via an inboard door 102 in the stowed posture.

The inboard hydraulic cylinder 101 is fixed in Such a manner so as to be capable of freely swinging at an inner wall of the stowing space for the leg about a swinging support point 10a provided at a central part of the linear actuator cylinder.

The inboard door 102 is a door on the inside of the leg stowing space. The inboard door 102 is supported to be centered about one side in a freely swingable manner at the main structure 100. The inboard door 102 supports the weight of the leg 104 from below when closed.

When the inboard hydraulic cylinder 101 extends the piston rod, the inboard door 102 opens. When the inboard hydraulic cylinder 101 pulls in the piston rod, the inboard door 102 closes.

The leg supporting hydraulic cylinder 103 is a hydraulic cylinder for swinging the leg 104 between the landing posture and the stowed posture.

The leg 104 is a support structure for a wheel landing on the ground when the moving body lands to provide a wheel support structure.

The outboard door 105 is a door on the outside of the leg stowing space.

When the leg supporting hydraulic cylinder 103 extends the piston rod, the leg 104 adopts the landing posture and the outboard door 105 is opened. When the leg supporting hydraulic cylinder 103 retracts the piston rod, the leg 104 adopts the stowed posture and the outboard door 105 is closed.

In the stowed posture, the inboard hydraulic cylinder 101 fixes the movement of the inboard door 102 and the inboard door 102 supports the leg 104 from below.

The inboard hydraulic cylinder 101 is then in a locked state. The piston and piston rod are therefore fixed, and the leg 104 maintains a stowed posture even if there is no pressurized oil from the pressurized oil source.

The weight of the leg 104 then acts on the inboard door 102 and a rod end 2 coupled to the piston rod of the inboard hydraulic cylinder 101 is urged towards the front.

While the pressurized oil supply is operating normally, the inboard hydraulic cylinder 101 and the leg supporting hydraulic cylinder 103 are switched over at the appropriate time so that the posture of the leg structure of the moving body may be made to change between a landing posture and a stowed posture.

In the event that the pressurized oil supply is damaged when the leg structure of the moving body is in the stowed position, the pilot of an airplane may pull the operation wire in the flight deck. The release lever 80 is then made to swing using the operation wire so as to push the push rod 70 of the inboard hydraulic cylinder 101. The locked state of the inboard hydraulic cylinder 101 is then released by the above operation. The weight of the leg 104 then pulls the rod end 2 of the inboard hydraulic cylinder 101 in an advancing direction and the piston rod of the inboard hydraulic cylinder 101 extends. The leg 104 then loses the support of the inboard door 102, falls downwards, and adopts the landing posture. The posture of the leg 104 can then reliably adopt the landing posture.

According to a linear actuator capable of reciprocating a rod end 2 at a prescribed stroke in a direction from the front to the rear for the embodiment described above, the following effects are exhibited.

A groove G is provided to the rear of an inner wall S of the cylinder 10. A locking ram 50 capable of freely sliding in a radial direction and a cam rod 40 having a profile P changing with a transition from the rear to the front from a small diameter part to a large diameter part are provided at a piston 20. The inner end of the locking ram 50 makes contact with the profile P, the cam rod 40 is urged to the rear by the spring 60. The cam rod 40 can be pushed to the front by a push rod 70. When the rear part of the push rod 70 is pressed while the piston 20 moves to the rear part of the overall cylindrical space H so as to be locked, the push rod 70 causes the cam rod 40 to move to the front, the inner end of the locking ram 50 collides with the small diameter part; the outer end of the locking ram slips out from the groove G, the lock is released, and the piston is able to advance.

Further, a hydraulic valve is provided for causing the piston 20 to move in a reciprocating manner. A piston rod 30 coupled to the piston 20 is provided and a rod end 2 coupled to the piston rod 30 is coupled to an item that is acted upon that is urged by a prescribed force to the front. It is therefore possible to move the piston rod 30 to the front and back by switching the hydraulic valve. In the event that the pressurized oil supply is damaged while the piston 20 moves to the rear so as to be locked, when the rear part of the push rod 70 is pressed, locking of the piston is released, and the piston 20 can be made to advance using a prescribed urging force.

By adopting the linear actuator described above as a hydraulic actuator for a leg structure for moving body use, a leg can be made to adopt a landing posture using a remote operation even in the event that a pressurized oil source for a moving body is damaged during flight.

Further, by providing a release lever operated by an operation wire, it is possible for locking of the linear actuator to be released by pulling the operation wire remotely in the event of failure of the pressurized oil source.

The present invention is by no means limited to the above embodiment and various modifications are possible providing such modifications do not deviate from the spirit of the invention.

A description is given of an example where a linear actuator is provided with a piston rod but this is by no means limiting and, for example, a ram-type actuator is also possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A linear actuator capable of generating thrust in a direction back and forth, comprising:
    a cylinder having an overall cylindrical space with an inner wall S of a prescribed internal diameter D and being provided with a groove G disposed rearwardly of the inner wall S and having an internal dimension larger than the internal diameter D;
    a piston, sealing a gap with the inner wall S, supported so as to be capable of freely sliding back and forth;
    a cam rod, constituting an axial body supported inside the piston so as to be capable of freely sliding back and forth with a rear end exposed at a rear of the piston, having a profile changing at one location from a small diameter part of outer diameter D1 to a large diameter part of a outer diameter D2 larger than D1 in accordance with a transition from a rear to a front of the cam rod;
    a locking ram constituting a block supported at the piston in a manner freely slidable in a radial direction, with an outer end of the locking ram constituting an end on the outside in a radial direction and being capable of projecting out from or being pulled into a line for a distance of D/2 from a center of the piston so that an inner end of the locking ram constituting an end on the inside in the radial direction is capable of coming into contact with the profile of the cam rod;
    a spring built-into the piston urging the cam rod rearwardly;
    a push rod, constituting an axial body supported in a freely sliding manner in a direction back and forth at the cylinder so that a rear end of the push rod is exposed at the rear part of the cylinder and a front end of the push rod is exposed at the rear part of the overall cylindrical space and faces a rear end of the cam rod; and
    a release lever supported on an outer part of the cylinder, the release lever capable of pushing the push rod and the cam rod forwardly,
    wherein, while the piston moves to a rear part of the overall cylindrical space, the inner end of the locking ram presses against the large diameter part so that the outer end of the locking ram fits into the groove G, and in this state, the front end of the push rod is able to press the cam rod,
    wherein said cam rod includes a projection having an outer diameter Dp smaller than the outer diameter D1 of the small diameter part and a ring portion extending radially inward directly from the outer diameter D1 at a rear end of the small diameter part to the outer diameter Dp at a front end of the projection, and
    wherein a flat end surface of said push rod engages directly with a flat end surface of said projection for selectively imparting reciprocation thereto for permitting said locking ram to selectively engage the small diameter part of the cam rod for releasing said locking ram.

2. The linear actuator as disclosed in claim 1, wherein the release lever is supported in a freely swinging manner at an outer part of the cylinder.

3. The linear actuator as disclosed in claim 1, wherein the cylinder has a swinging support point supporting the linear actuator in a manner capable of swinging at an outer wall.

4. The linear actuator as disclosed in claim 1, and further including a piston seal positioned on said piston for sealing the gap with the inner wall.

5. The linear actuator as disclosed in claim 1, wherein said inner end of said locking ram includes a beveled surface for selectively mating with the large diameter of the ram rod for extending said locking ram and for engaging with said profile to selectively mate with the small diameter of the ram rod for retracting the locking ram.

6. The linear actuator as disclosed in claim 1, and further including a cam rod seal positioned on said cam rod for sealing a gap with said cam rod and an inner wall of said piston in which said cam rod is slidably engaged.

7. The linear actuator as disclosed in claim 1, wherein release lever is operatively connected to said push rod for manually imparting reciprocation thereto if a pressurized fluid for imparting motion to said cam rod is below a predetermined pressure.

8. The linear actuator as disclosed in claim 1, the front end of the push rod is exposed to the groove G at the rear part of the overall cylindrical space.

9. The linear actuator as disclosed in claim 1, further comprising:
    a piston rod constituting a cylindrical member, a rear end of the piston rod being coupled to a front part of the piston, and a rod end passing through so as to seal a front part of the cylinder so as to enable coupling of the rod end to a subject of action,
    wherein pressurized oil is selectively provided to a front hydraulic chamber and a rear hydraulic chamber of the overall cylindrical space dividing the piston to the front and rear, and the rod end is connected to the subject of action urged to the front by a prescribed force, and
    further comprising a leg for a flying or floating moving body,
    wherein the subject of action is a leg structure having an inboard door, and at a time of stowing, the inboard door supporting a weight of the leg from below when the leg is stowed, and when the cylinder is released by the release lever, the leg loses support of the inboard door, the weight of the leg pulling the piston of the cylinder into an extended position.

10. The linear actuator as disclosed in claim 9, wherein in addition to the inboard door supporting a weight of the leg from below when the leg is stowed,
the leg structure also includes a second cylinder and an outboard door,
wherein a weight of the leg is capable of pulling the second cylinder into an extended position.

11. The linear actuator as disclosed in claim 10, when the second cylinder extends, the leg adopts the landing posture, and the outboard door is opened, and
when the second cylinder retracts, the leg adopts the stowed posture, and the outboard door is closed.

12. The linear actuator as disclosed in claim 9, wherein in addition to the inboard door of the leg structure also includes an outboard door,
wherein the inboard door and outboard door being rotatable in opposite directions, wherein the outboard door is adapted to close on an outside of a leg stowing space.

13. A linear actuator capable of generating thrust in a direction back and forth, comprising:
a cylinder having an inner wall of a prescribed internal diameter D and a groove G formed in a rear portion of said cylinder having an internal dimension larger than the internal diameter D;
a piston slidably mounted within said cylinder for sliding back and forth;
a cam rod operatively mounted within an aperture within said piston so as to be capable of sliding back and forth with a rear end exposed at a rear of the piston, said cam rod having a profile changing at one location from a small diameter part of outer diameter D1 to a large diameter part of a outer diameter D2 larger than D1 in accordance with a transition from the rear to the front of the cam rod;
a locking ram supported at the piston in a manner slidable in a radial direction with an outer end of the locking ram projecting out therefrom or said locking ram being pulled inwardly wherein the locking ram comes into contact with the profile;
a biasing member for urging the cam rod to the rear;
a push rod supported in a sliding manner in a direction back and forth relative to the cylinder so that a rear end of the push rod is exposed at the rear part of the cylinder and a front end of the push rod is exposed at the rear part of the overall cylindrical space and faces a rear end of the cam rod; and
a release lever supported on an outer part of the cylinder, the release lever capable of pushing the push rod and the cam rod forwardly,
wherein, while the piston moves to a rear part of the overall cylindrical space, the inner end of the locking ram presses against the large diameter part so that the outer end of the locking ram fits into the groove, and in this state, the front end of the push rod is able to press the cam rod for permitting selective manual actuation of the cam rod by said push rod, and
wherein said cam rod includes a projection having an outer diameter Dp smaller than the outer diameter D1 of the small diameter part, and a ring portion extending radially inward directly from the outer diameter D1 at a rear end of the small diameter part to the outer diameter Dp at a front end of the projection, and
wherein a flat end surface of said push rod engages directly with a flat end surface of said projection for selectively imparting reciprocation thereto for permitting said locking ram to selectively engage the small diameter part of the cam rod for releasing said locking ram.

14. The linear actuator as disclosed in claim 13, wherein said release lever is supported in a freely swinging manner at an outer part of the cylinder.

15. The linear actuator as disclosed in claim 13, wherein the cylinder has a swinging support point supporting the linear actuator in a manner capable of swinging at an outer wall.

16. The linear actuator as disclosed in claim 13, and further including a piston seal positioned on said piston for sealing the gap with the inner wall.

17. The linear actuator as disclosed in claim 13, wherein said inner end of said locking ram includes a beveled surface for selectively mating with the large diameter of the ram rod for extending said locking ram and for engaging with said profile to selectively mate with the small diameter of the ram rod for retracting the locking ram.

18. The linear actuator as disclosed in claim 13, and further including a cam rod seal positioned on said cam rod for sealing a gap with said cam rod and an inner wall of said piston in which said cam rod is slidably engaged.

19. The linear actuator as disclosed in claim 13, wherein the release lever operatively is connected to said push rod for manually imparting reciprocation thereto if a pressurized fluid for imparting motion to said cam rod is below a predetermined pressure.

20. The linear actuator as disclosed in claim 13, the front end of the push rod is exposed to the groove G at the rear part of the overall cylindrical space.

21. The linear actuator as disclosed in claim 13, further comprising:
a piston rod constituting a cylindrical member, a rear end of the piston rod being coupled to the front part of the piston, and a rod end passing through so as to seal the front part of the cylinder so as to enable coupling at the rod end,
wherein pressurized fluid is selectively provided to a front hydraulic chamber and a rear hydraulic chamber of the overall cylindrical space dividing the piston to the front and rear, and the rod end is connected to an actuated member urged to the front by a prescribed force, and
further comprising a leg for a flying or floating moving body,
wherein the actuated member is a leg structure having an inboard door, and at a time of stowing, the inboard door supporting a weight of the leg from below when the leg for the flying or floating moving body is stowed, and when the cylinder is released by the release lever, the leg loses support of the inboard door, the weight of the leg pulling the piston of the cylinder into an extended position.

22. The linear actuator as disclosed in claim 21, wherein in addition to the inboard door supporting a weight of the leg from below when the leg is stowed,
the leg structure also includes a second cylinder and an outboard door
wherein a weight of the leg is capable of pulling the second cylinder into an extended position.

23. The linear actuator as disclosed in claim 22, when the second cylinder extends, the leg adopts the landing posture, and the outboard door is opened, and
when the second cylinder retracts, the leg adopts the stowed posture, and the outboard door is closed.

24. The linear actuator as disclosed in claim 21, wherein in addition to the inboard door of the leg structure also includes an outboard door, wherein the inboard door and outboard door being rotatable in opposite directions, wherein the outboard door is adapted to close on an outside of a leg stowing space.

25. A linear actuator capable of generating thrust in a direction back and forth, comprising:

a cylinder having an overall cylindrical space with an inner wall S of a prescribed internal diameter D and being provided with a groove G disposed rearwardly of the inner wall S and having an internal dimension larger than the internal diameter D;

a piston, sealing a gap with the inner wall S, supported so as to be capable of freely sliding back and forth;

a cam rod, constituting an axial body supported inside the piston so as to be capable of freely sliding back and forth with a rear end of the cam rod being disposed toward a rear of the cylinder, having a profile changing at one location from a small diameter part of outer diameter D1 to a large diameter part of a outer diameter D2 larger than D1 in accordance with a transition from a rear to a front of the cam rod;

a locking ram constituting a block supported at the piston in a manner freely slidable in a radial direction, with an outer end of the locking ram constituting an end on the outside in a radial direction and being capable of projecting out from or being pulled into a line for a distance of D/2 from a center of the piston so that an inner end of the locking ram constituting an end on the inside in the radial direction is capable of coming into contact with the profile of the cam rod;

a spring built-into the piston urging the cam rod rearwardly;

a push rod, constituting an axial body supported in a freely sliding manner in a direction back and forth at the cylinder so that a rear end of the push rod is exposed at the rear part of the cylinder and a front end of the push rod is exposed at the rear part of the overall cylindrical space, wherein, while the piston moves to a rear part of the overall cylindrical space, the inner end of the locking ram presses against the large diameter part so that the outer end of the locking ram fits into the groove G, and in this state, the front end of the push rod is able to press the cam rod further comprising a piston rod constituting a cylindrical member, a rear end of the piston rod being coupled to a front part of the piston, and a rod end passing through so as to seal a front part of the cylinder so as to enable coupling of the rod end to a subject of action wherein said cam rod includes a projection having an outer diameter Dp smaller than the outer diameter D1 of the small diameter part, and a ring portion extending radially inward directly from the outer diameter D1 at a rear end of the small diameter part to the outer diameter Dp at a front end of the projection, and wherein a flat end surface of said push rod engages directly with a flat end surface of said projection for selectively imparting reciprocation thereto for permitting said locking ram to selectively engage the small diameter part of the cam rod for releasing said locking ram.

26. The linear actuator as disclosed in claim 25, further comprising a release lever supported on an outer part of the cylinder, the release lever capable of pushing the rear end of the push rod forwardly.

27. The linear actuator as disclosed in claim 25, the front end of the push rod is exposed to the groove G at the rear part of the overall cylindrical space.

28. The linear actuator as disclosed in claim 25, wherein pressurized oil is selectively provided to a front hydraulic chamber and a rear hydraulic chamber of the overall cylindrical space dividing the piston to the front and rear, and the rod end is connected to the subject of action urged to the front by a prescribed force, and further comprising a leg for a flying or floating moving body, wherein the subject of action is a leg structure having an inboard door, and at a time of stowing, the inboard door supporting a weight of the leg from below when the leg is stowed, and when the cylinder is released by the release lever, the leg loses support of the inboard door, the weight of the leg pulling the piston of the cylinder into an extended position.

29. The linear actuator as disclosed in claim 28, wherein in addition to the inboard door supporting a weight of the leg from below when the leg is stowed, the leg structure also includes a second cylinder and an outboard door wherein a weight of the leg is capable of pulling the second cylinder into an extended position.

30. The linear actuator as disclosed in claim 29, when the second cylinder extends, the leg adopts the landing posture, and the outboard door is opened, and when the second cylinder retracts, the leg adopts the stowed posture, and the outboard door is closed.

31. The linear actuator as disclosed in claim 28, wherein in addition to the inboard door of the leg structure also includes an outboard door, wherein the inboard door and outboard door being rotatable in opposite directions, wherein the outboard door is adapted to close on an outside of a leg stowing space.

* * * * *